(12) United States Patent
Shank et al.

(10) Patent No.: US 8,633,813 B2
(45) Date of Patent: *Jan. 21, 2014

(54) VEHICLE LIGHT SYSTEM (75) Inventors: David Shank, Hersey, MI (US); Edward Cox, Marion, MI (US); John Washeleski, Cadillac, MI (US)

(73) Assignee: Uusi, LLC, Reed City, MI (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/339,599

(22) Filed: Dec. 29, 2011

(65) Prior Publication Data

US 2012/0119898 A1 May 17, 2012

Related U.S. Application Data (63) Continuation-in-part of application No. 12/614,866, filed on Nov. 9, 2009, now Pat. No. 8,089,350, which is a continuation-in-part of application No. 11/649,692, filed on Jan. 4, 2007, now Pat. No. 7,616,108.

(60) Provisional application No. 60/840,303, filed on Aug. 25, 2006.

(51) Int. Cl.
*B60Q 11/00* (2006.01)

(52) U.S. Cl.
USPC .......................................... 340/458; 340/664

(58) Field of Classification Search
USPC .......................... 340/458, 657, 664
See application file for complete search history.

(56) References Cited

U.S. PATENT DOCUMENTS

| 4,611,291 | A | 9/1986 | Hoelscher |
| 4,841,198 | A | 6/1989 | Wilhelm |
| 4,866,390 | A | 9/1989 | Butchko |
| 5,247,280 | A | 9/1993 | Brooks |
| 5,517,064 | A | 5/1996 | Murakami |
| 5,629,680 | A | 5/1997 | Makhija |
| 5,935,180 | A * | 8/1999 | Fieramosca et al. .......... 340/458 |
| 6,002,330 | A | 12/1999 | Brandt |
| 6,160,475 | A | 12/2000 | Hornung et al. |
| 7,616,108 | B2 | 11/2009 | Shank et al. |
| 8,089,350 | B2 * | 1/2012 | Shank et al. ................. 340/458 |

* cited by examiner

*Primary Examiner* — John A Tweel, Jr.
(74) *Attorney, Agent, or Firm* — Tarolli, Sundheim, Covell & Tummino LLP (57) ABSTRACT

One embodiment of the present application includes a vehicle illumination system. The vehicle illumination system comprises an input keypad configured to receive at least one input provided by a user. The vehicle illumination system also comprises a controller configured to receive input commands provided by the input keypad and to sequentially control a state of a plurality of output device drivers corresponding to a respective plurality of vehicle lamps. At least one indicator is configured to indicate to a user a condition associated with at least one of the plurality of output device drivers wherein the controller communicates with the indicator by means of a communications protocol.

26 Claims, 12 Drawing Sheets

VEHICLE LIGHT SYSTEM

CROSS REFERENCE TO RELATED APPLICATIONS

This application is a continuation in part and claims the benefit of and priority to U.S. patent application Ser. No. 12/614,866 entitled "Vehicle Light System", filed Nov. 9, 2009 now U.S. Pat. No. 8,089,350, which in turn claims the benefit of and priority to U.S. patent application Ser. No. 11/649,692, now U.S. Pat. No. 7,616,108 which was filed Jan. 4, 2007 which in turn claims priority from of U.S. Provisional Application No. 60/840,303, which was filed Aug. 25, 2006, and entitled "Vehicle Light System", the entire contents of both patent applications are incorporated herein by reference in their entirety for all purposes.

FIELD OF THE INVENTION

The present invention concerns a motor vehicle lamp actuation system.

BACKGROUND

Several different methods have been developed for controlling vehicle lighting systems. The earliest models were strictly mechanical switches packaged in a single housing. This method can be difficult to actuate due to mechanical forces and sequences and the failure rate is high due to constant actuation and mechanical wear of the switch components. Protection circuitry consisted of a bi-metal switch that would break the battery line when a current overload condition was present. When an over-current mode existed, this solution would not resolve the problem quickly enough, causing excessive heating and possible damage to other components.

Another method was the use of solid state devices, which improved ease of use and increased the product life. While solid state devices provide rapid response for shutting down in an over-current condition, they were vulnerable to over-voltages which could cause the devices to fail.

U.S. Pat. No. 4,866,390 to Butchko concerns a vehicle light testing system for testing the lighting systems of a vehicle having a number of lights with different operating functions.

SUMMARY

The disclosure concerns a motor vehicle lamp control method and control apparatus wherein a controller is configured to execute a control program and activate output circuitry comprising a plurality of lamp drivers having inputs coupled to the controller and outputs for actuating multiple motor vehicle lamps.

An exemplary vehicle illumination system has an input configured to receive at least one input command and a controller configured to receive input commands provided by the input and to control a state of a plurality of output device drivers corresponding to a respective plurality of vehicle light sources that are selectively energized. At least one indicator is configured to indicate to a user a condition associated with at least one of the plurality of output device drivers wherein the controller communicates with the indicator by means of a communications protocol.

DETAILED DESCRIPTION OF THE INVENTION

An exemplary embodiment provides hardware which prevents damage to a vehicle light system in the event faults occur. The exemplary embodiment removes power from lamp drivers during transients and load dumps, thus protecting them from damage. The exemplary embodiment allows voltage transients into an exemplary control system without damage occurring.

Figure 1:
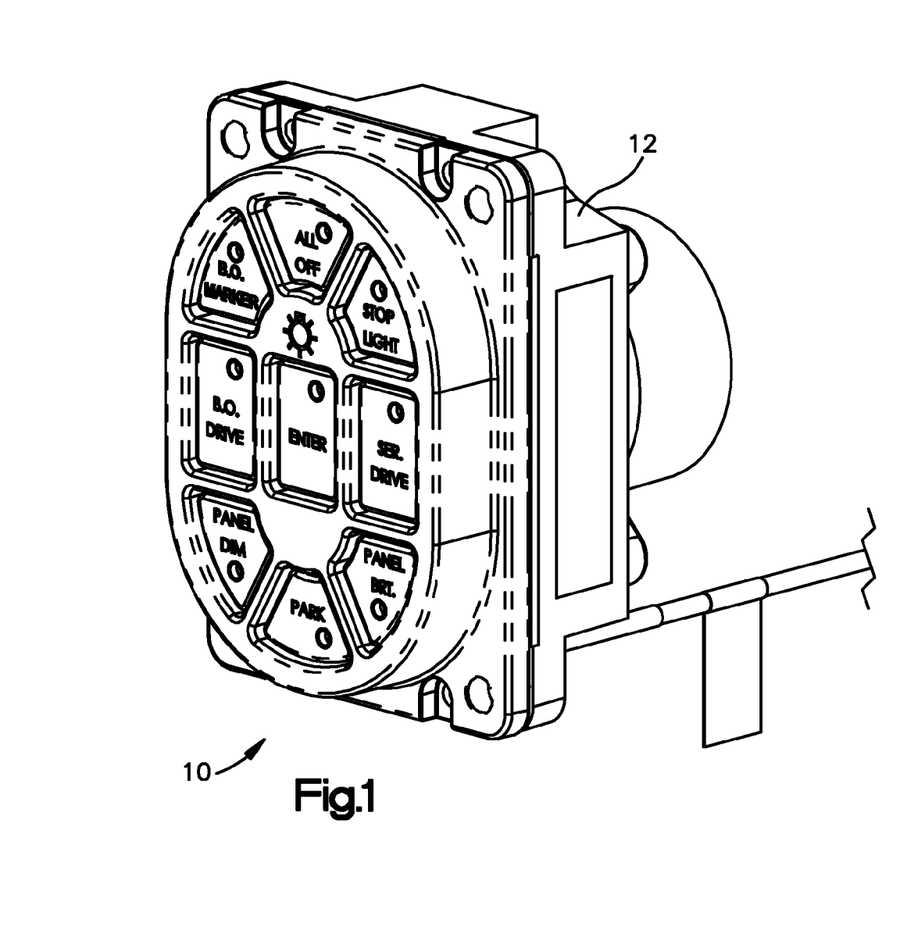
FIG. 1 illustrates a schematic perspective of an example of an input device for user actuation of motor vehicle lamps.

FIG. 1 depicts an exemplary embodiment of a user input interface 10 for actuating motor vehicle lamps. The input interface 10 includes a keypad 11, preferably made of an elastomeric material, secured within an enclosure 12; and the enclosure 12 preferably made of die cast aluminum mounted to a motor vehicle dashboard (not shown). Within an interior of the enclosure 12, there is support circuitry on one or more printed circuit boards (PCBs), described more fully below, that selectively actuates headlamp, stop lamp, and other vehicle lamps whether filament bulbs or Light Emitting Diode (LED) types, collectively referred to as vehicle lamps 14, of a motor vehicle.

Figure 1A:
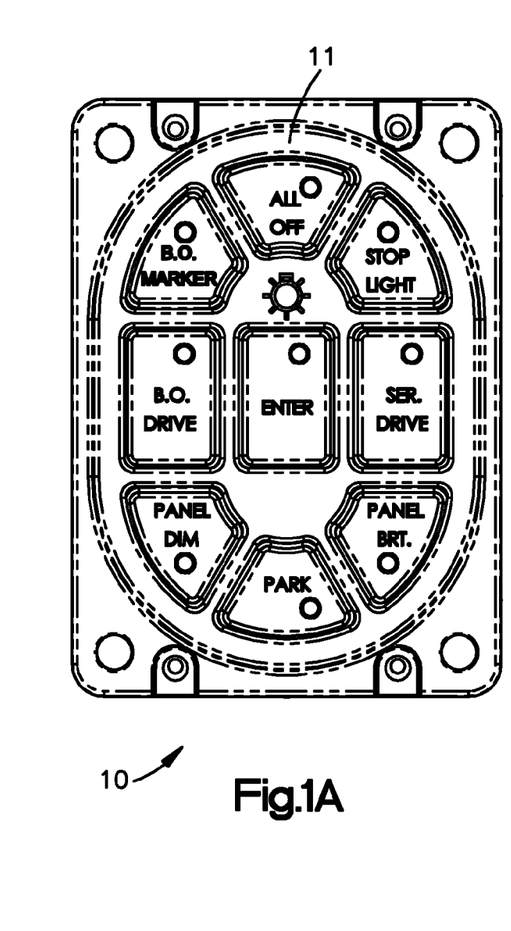
FIG. 1A illustrates a front view of the example of the input device for user actuation of motor vehicle lamps.

FIG. 1A depicts a front view of the user input interface 10 for actuating the motor vehicle lamps 14. In the example of FIG. 1A, the keypad 11 includes nine separate user input keys, each identified with text that describes a respective lamp control function. The text for each of the nine user input keys can be illuminated by a backlight LED, as is explained in greater detail in the example of FIG. 6 below. In addition, each of the nine user input keys can include an indicator LED that can, for example, provide an indication to the user of a current illumination mode. For example, one or more of the indicator LEDs can be solidly illuminated to indicate that a given illumination mode is currently active, or can be flashed to indicate that the user input interface 10 is awaiting further user input after selecting a given illumination mode.

In the example of FIG. 1A, the keypad 11 demonstrates, via the text of the user input keys, different illumination modes which the user can initiate. For example, the illumination modes can be separated into mutually exclusive primary modes, such as "Blackout Drive," "Blackout Marker," "Stop Light," "Service Drive," "Park," and "All Off." Each of the primary modes can activate a certain combination of the vehicle lamps. In addition, the illumination modes can also include mutually exclusive auxiliary modes, such as "Panel Dim" and "Panel Bright," which can be implemented concurrently with one or more of the primary modes. Furthermore, in the example of FIG. 1A, the keypad 11 includes a centrally positioned "Enter" key that can allow the user to confirm selection of a selected illumination mode subsequent to pressing the user input key corresponding to the appropriate illumination mode.

Figure 4:
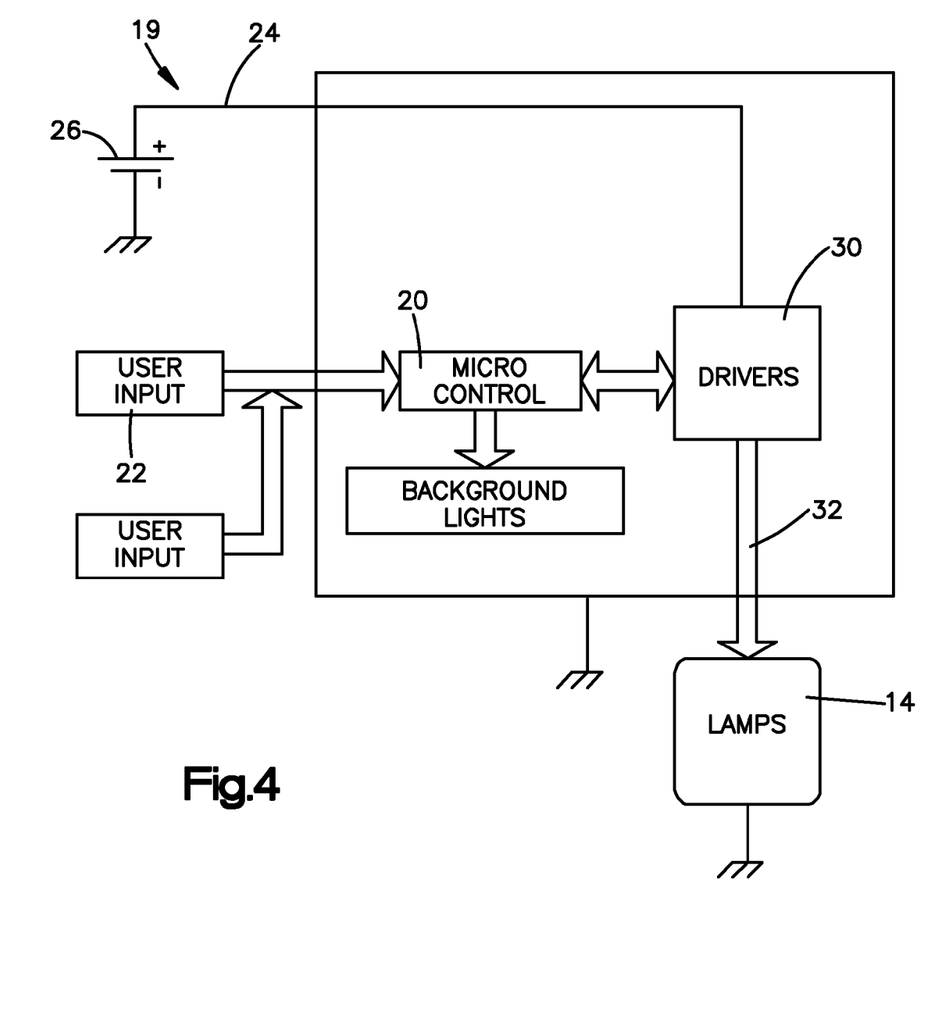
FIG. 4 illustrates an example of an overview of a vehicle light system.

FIG. 4 depicts a block diagram 19 of an exemplary control system that includes a microcontroller 20 which implements in software certain features for enhancing product performance and for providing more operator options. In addition to the microcontroller 20, the circuitry depicted in FIG. 4 includes a user interface input circuit 22 that issues commands to the microcontroller 20 based on user actuation of user input keys on the keypad 11. In response to the inputs at the keyboard 11, the microcontroller 20 issues commands to couple battery voltage at an input 24 from a battery 26 to driver circuits 30 having outputs 32 coupled to the vehicle lamps 14.

Figure 3:
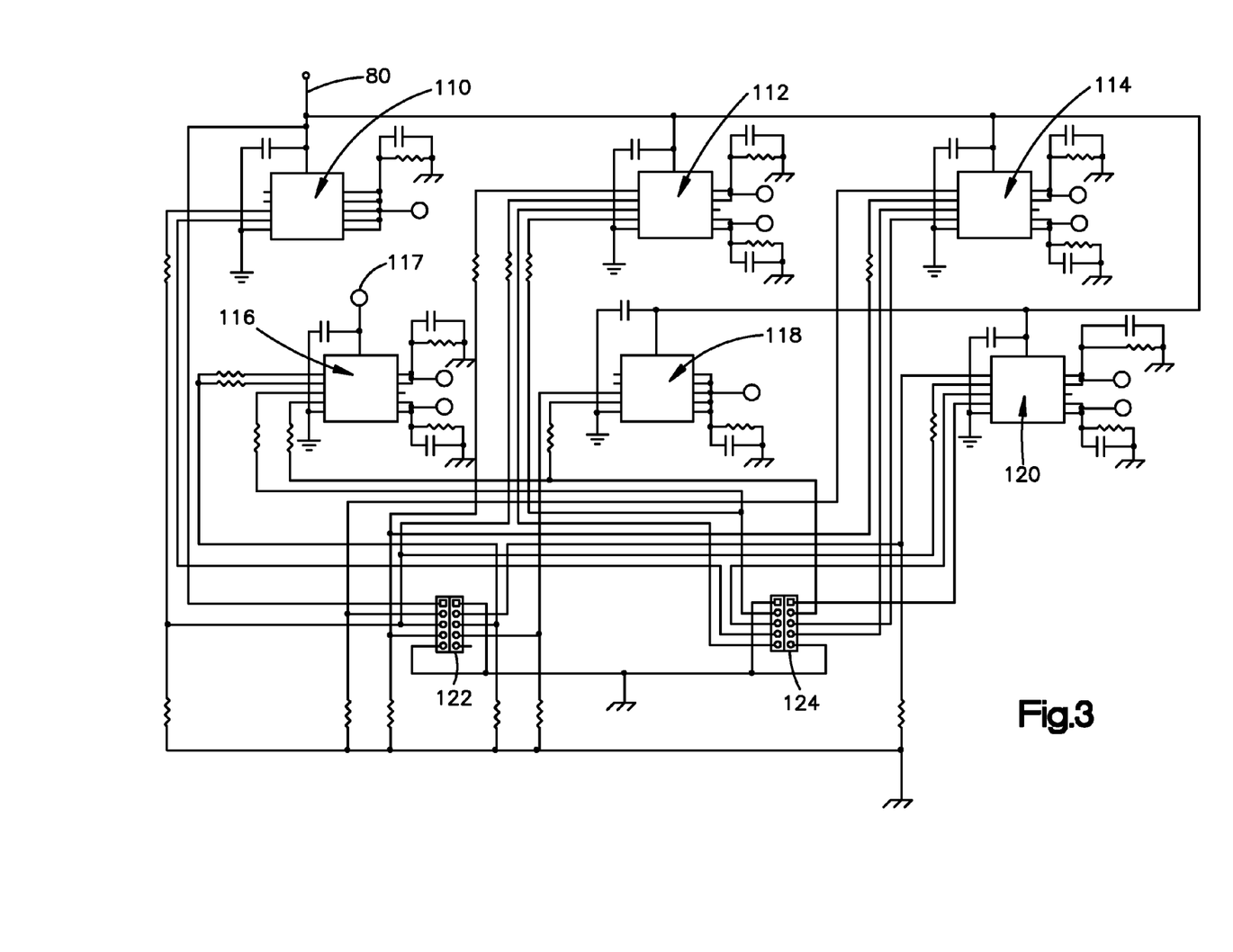
FIG. 3 illustrates an example of an output control circuit associated with a microprocessor controller in a vehicle light system.

With reference to FIG. 3, the driver circuits 30 (of FIG. 4) are illustrated as including selectively activated output device drivers 110, 112, 114, 116, 118, and 120. As an example, each of the output device drivers 110, 112, 114, 116, 118, and 120 can be associated with a separate one or a separate set of the lamps 14 of the vehicle illumination system, such that each of the lamps 14 or each set of the lamps 14 can be individually controlled based on a user's selection of a primary and/or auxiliary illumination mode. For example, the driver 110 can be associated with the headlamps, such that the headlamps can be activated differently and independently of other lamps in the illumination system. In one example embodiment, the output device drivers 110 and/or 118 are single drivers. One example of a suitable single driver includes a smart high side high current power switch made by Infineon Technologies under part number BTS660P. The data and specification sheets for the Infineon Technologies' BTS660P driver are incorporated herein by reference. In another example embodiment, the output device drivers 112, 114, 116, and 120 are dual drivers. One example of a suitable dual driver includes a smart dual high side current power switch by STMicroelectronics under part number VND600. The data and specification sheets for the STMicroelectronics' VND600 driver are incorporated herein by reference.

A junction block 124 is configured to couple control signals from the microcontroller 20 with the driver circuits 30 to provide individual activation and/or control of the output device drivers 110, 112, 114, 116, 118, and 120. Power is supplied to the output device drivers 110, 112, 114, 116, 118, and 120 by the battery at the input 80, demonstrated as coupled to all but the driver circuit 116. The driver circuit 116 has an input 117 that can be coupled to a battery voltage through a separate input, such as a vehicle brake pedal.

An output current associated with each of the output device drivers 110, 112, 114, 116, 118, and 120 can be monitored to determine the presence of a fault condition for the respective output device driver. In an exemplary embodiment, the output current from the output device drivers 110, 112, 114, 116, 118, and 120 is provided to a junction block 122 via a resistive voltage divider. Junction blocks 122 and 124 can be connectors, wire jumpers, ribbon cables and the like. In the example of FIG. 3, the resistive voltage divider is demonstrated as a resistor interconnecting each of the output device drivers 110, 112, 114, 116, 118, and 120 with the junction block 122, and a resistor interconnecting each respective terminal of the junction block 122 with ground. As a result, a scaled current associated with the respective output of each of the output device drivers 110, 112, 114, 116, 118, and 120 can be provided to an analog-to-digital converter (ADC) via the junction block 122. Therefore, a digital signal corresponding to the output current of each of the output device drivers 110, 112, 114, 116, 118, and 120 can be monitored to determine if the output current is above or below an operating range associated with the respective output device driver. For example, an output current of a given one of the output device drivers 110, 112, 114, 116, 118, and 120 that is greater than the operating range could indicate a fault condition. As another example, an output current of a given one of the output device drivers 110, 112, 114, 116, 118, and 120 that is less than the operating range could indicate an open circuit, such as from a burned-out lamp.

FIGS. 5-8 depict flow diagrams that demonstrate embodiments for operation of the vehicle illumination system.

Figure 5:
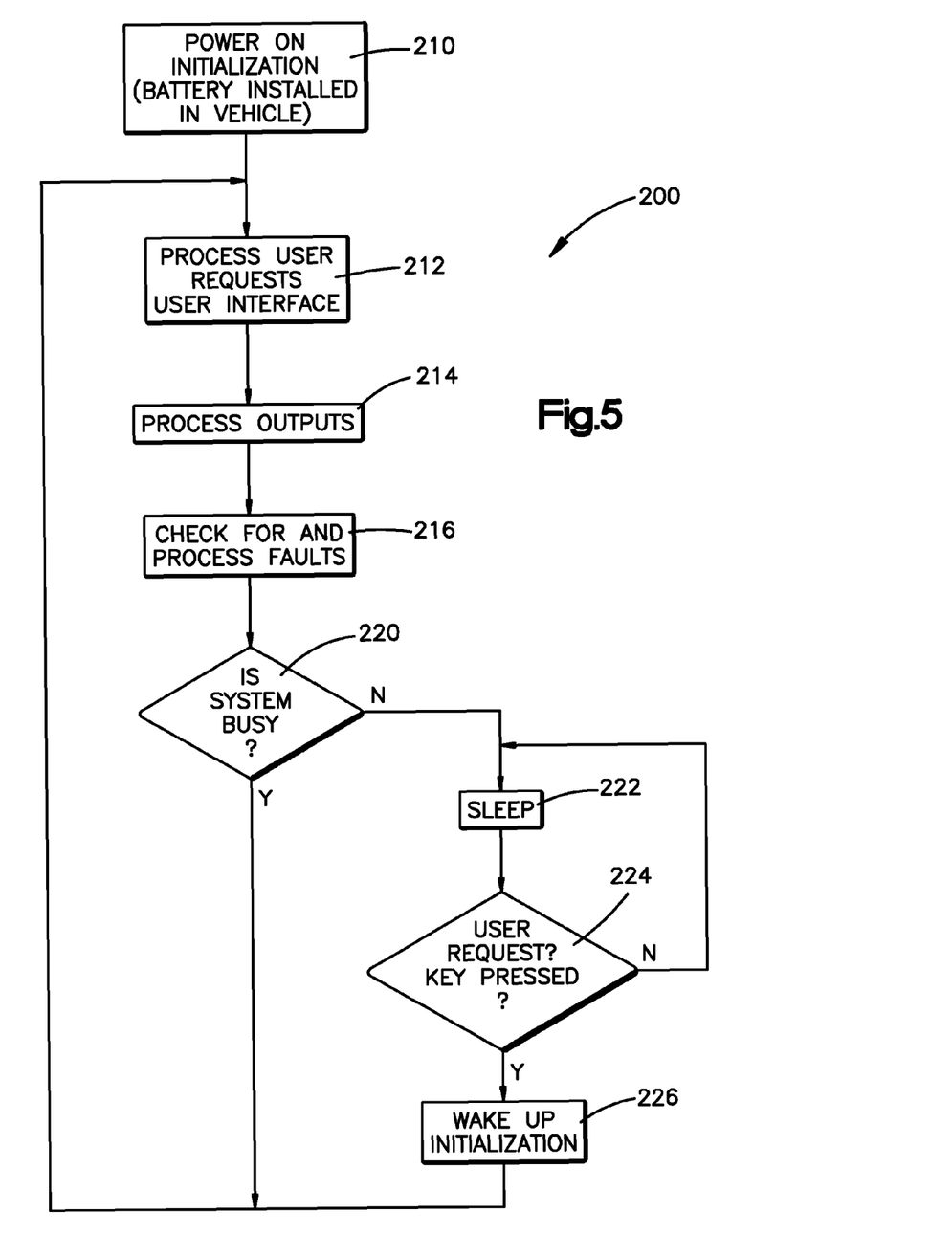
FIG. 5 illustrates a flow diagram associated with an overview of a vehicle light system.

FIG. 5 depicts an embodiment of the present invention that includes a method 200 for controlling a vehicle illumination system. The method 200 includes initializing 210 the control system by providing power from a battery to the vehicle illumination system and processing 212 at least one user request via a user interface. The method 200 may also include processing 214 at least one output from a vehicle illumination system controller in response to the at least one user request. The method 200 may also include continuously monitoring the at least one output and processing 216 at least one fault associated with the at least one output upon determining the presence of the at least one fault. The method 200 may also include conserving battery power by entering a sleep mode state 222 in response to not receiving at least one input 220 for a predetermined amount of time. The method 200 may further include re-initializing 226 the control system upon determining 224 at least one user input key has been pressed.

Figure 6A:
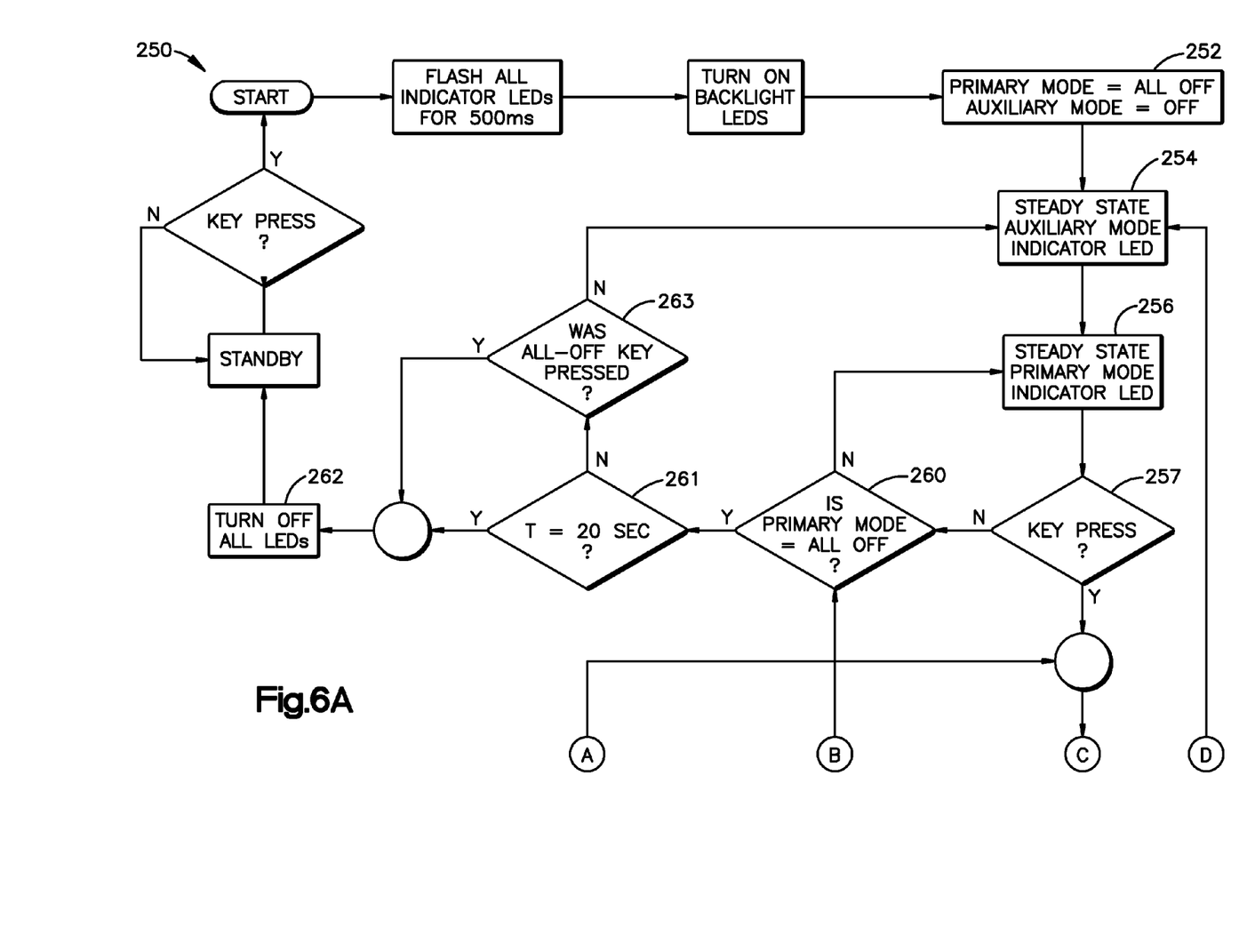
FIGS. 6A and 6B illustrate a flow diagram associated with entering user inputs in a vehicle light system.
Figure 6B:
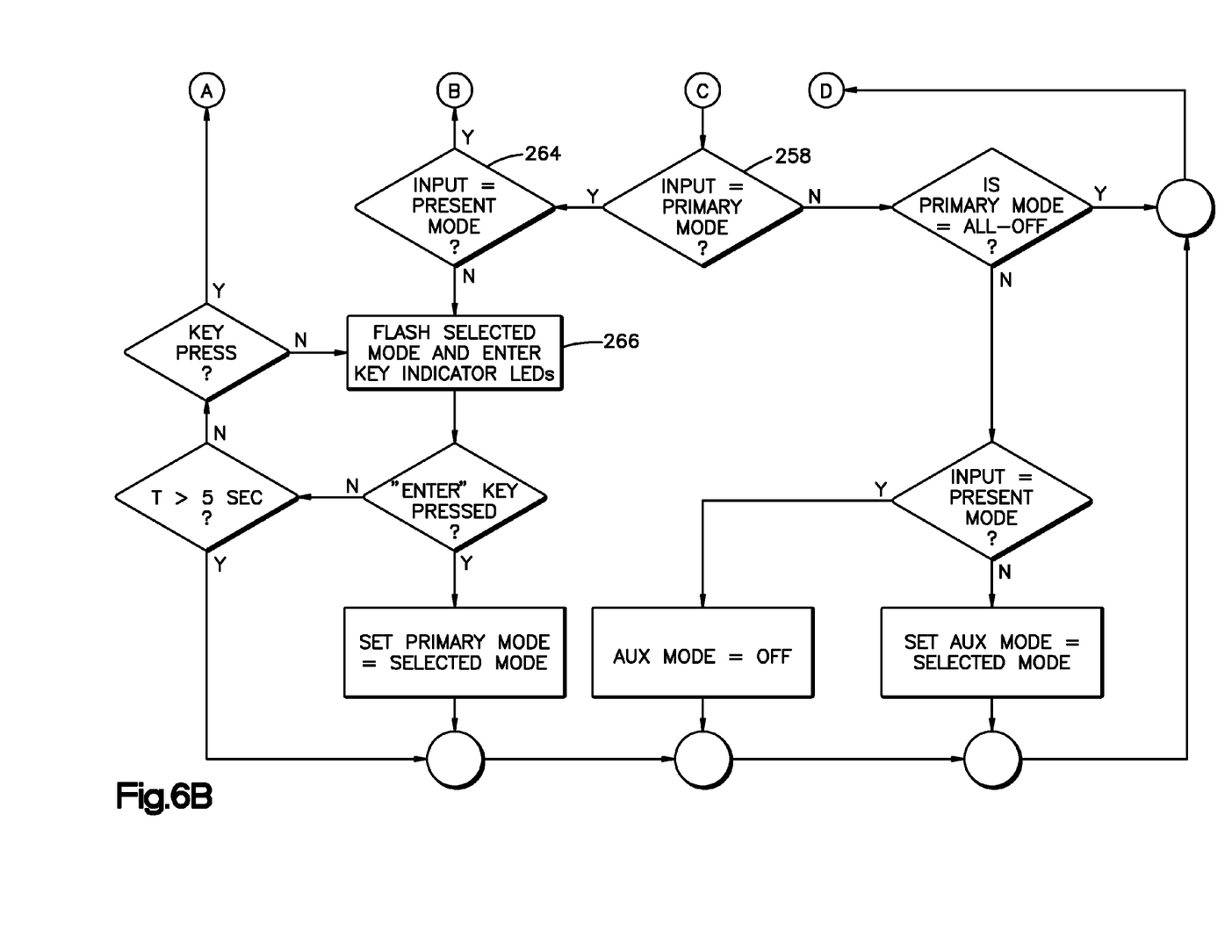

FIGS. 6A and 6B depict a flow-chart of an exemplary embodiment of the present invention that includes a method 250 for controlling inputs to a user interface, such as the user input interface 10 in the example of FIGS. 1 and 1A. In FIG. 6A, upon initializing the user input interface, such as by pressing any key on the user interface, each of the LEDs of the vehicle are configured to flash for a preset amount of time, such as 500 milliseconds. After the LEDs complete the flashing cycle, the user input interface backlight LEDs are activated, such that the text on each of the user input keys is illuminated, and thus seen more clearly by a user.

FIG. 6A demonstrates at a step 252 that a primary illumination mode is set for "All Off" and that no auxiliary illumination modes are activated. As an example, no auxiliary modes activated and the "All Off" primary mode are a default setting for the vehicle illumination system. The method 250 then proceeds to a step 254, at which the current auxiliary mode LED indicator(s) are held at a steady state, then proceeds to a step 256, at which the current primary mode LED indicator is held at a steady state. As an example, in a steady state, the control system is set for a primary illumination mode and/or an auxiliary illumination mode, and is awaiting a user input at the keypad 11. The method 250 then determines 257 if a user input key has been pressed. If a user input key has been pressed, then the method 250 proceeds to a decision 258 (depicted on FIG. 6B), via the linking symbol "C".

If a key has not been pressed, the method 250 determines 260 if the primary mode is set for "All Off". If the primary mode is not set for "All Off", the method 250 returns to the step 256. If the primary mode is set for "All Off", the method 250 determines 261 if twenty seconds have elapsed in the "All Off" mode. If twenty seconds have elapsed in the "All Off" mode, the method 250 turns off all LEDs on the user input keypad 262. If twenty seconds have not elapsed in the "All Off" mode, the method 250 determines 263 if the "All Off"

key was pressed. If the "All Off" key was not pressed, the method 250 returns to the step 254. If the "All Off" key was pressed, the method 250 turns off all LEDs on the user input keypad 262. The method 250 then enters a standby mode and awaits another key press before re-initializing the user input keypad 11 again.

The above described method 250 in the example of FIG. 6A thus demonstrates deactivation of the user input keypad 11. Specifically, FIG. 6A demonstrates that the user input keypad 11 is deactivated upon pressing the "All Off" key, or through twenty seconds of inaction after initializing the user input keypad 11. FIG. 6B demonstrates changing modes through selecting a mode via the user input keypad 11.

Upon a key being pressed with the controller in the steady state, the method 250 determines 258 if the input (i.e., the pressed key) corresponds to a primary mode. If the input corresponds to a primary mode, the method 250 proceeds to the decision 264. If the input does not correspond to a primary mode, the selected input corresponds to an auxiliary mode and the method 250 proceeds to a determination of whether the primary mode is set for "All Off". If the primary mode is set for "All Off", the method 250 returns to the step 254 on FIG. 6A, via the linking symbol "D". If the primary mode is not set for "All Off", the method 250 determines if the input (i.e., the pressed key) corresponds to the present auxiliary mode. If the input corresponds to the present auxiliary mode, the present auxiliary mode is set to off (i.e., deactivated). Thus, an auxiliary mode is deactivated by re-selecting it on the keypad 11. If the input does not correspond to the present auxiliary mode, the selected auxiliary mode, provided via the input, is set as the present auxiliary mode. The method 250 then returns to the step 254 on FIG. 6A, via the linking symbol "D".

If the user input corresponds to a primary mode at the decision 264, the method 250 determines if the provided input corresponds to the present primary mode. If the provided input corresponds to the present primary mode, the method 250 returns to the decision 260 on FIG. 6A, via the linking symbol "B". If the provided input does not correspond to the present primary mode, the method 250 proceeds to the step 266, at which the selected mode key and the "Enter" key indicator LEDs begin to flash. The method 250 then determines if the "Enter" key has been pressed. If the "Enter" key has been pressed, the selected primary mode, provided via the input, is set as the present primary mode, and the method 250 returns to the step 254 on FIG. 6A, via the linking symbol "D". If the "Enter" key has not been pressed, the method 250 determines if five seconds have elapsed. If five seconds have elapsed, the method 250 returns to the step 254 on FIG. 6A, via the linking symbol "D". If five seconds have not elapsed, the method 250 determines if a key has been pressed. If a key has not been pressed, the method 250 returns to the step 266. If a key has been pressed, the method 250 returns to the decision 258 via the linking symbols "A" and "C".

The above described method 250 in the example of FIG. 6B demonstrates that auxiliary modes can be activated and deactivated without pressing the "Enter" key. The above described method 250 also demonstrates that, upon selecting a primary mode, a delay of five seconds without pressing the "Enter" key results in the user input interface returning to the previously active primary mode. However, during the five second delay, a different primary mode can be selected without having to confirm the previous selection via the "Enter" key or having to wait for the five seconds to elapse. As such, the exemplary embodiment demonstrated by the method 250 in the example of FIG. 6 provides a user-friendly mode selection interface that is forgiving of a mistakenly selected primary mode.

Figure 7A:
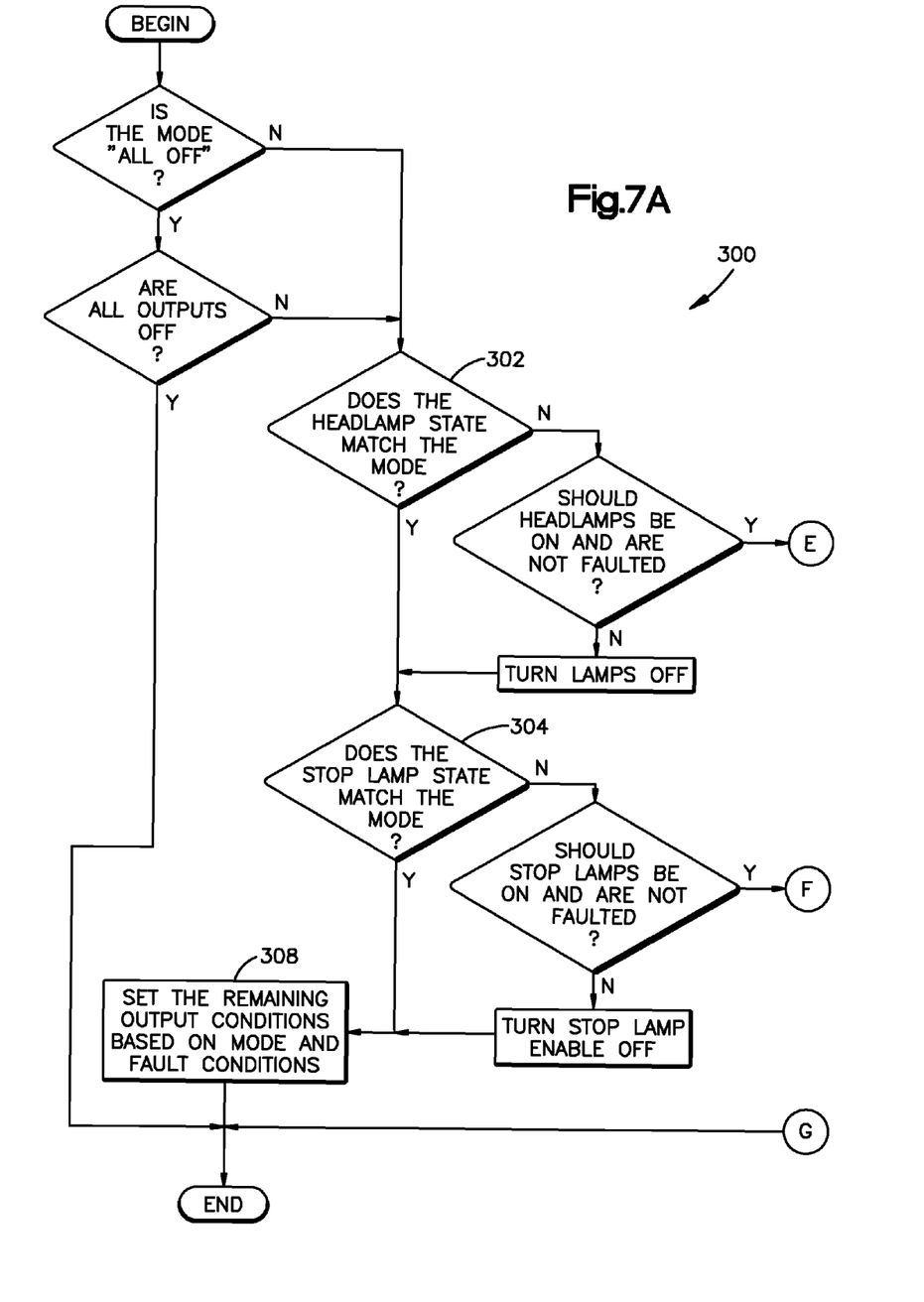
FIGS. 7A and 7B illustrate a flow diagram associated with processing outputs in a vehicle light system.
Figure 7B:
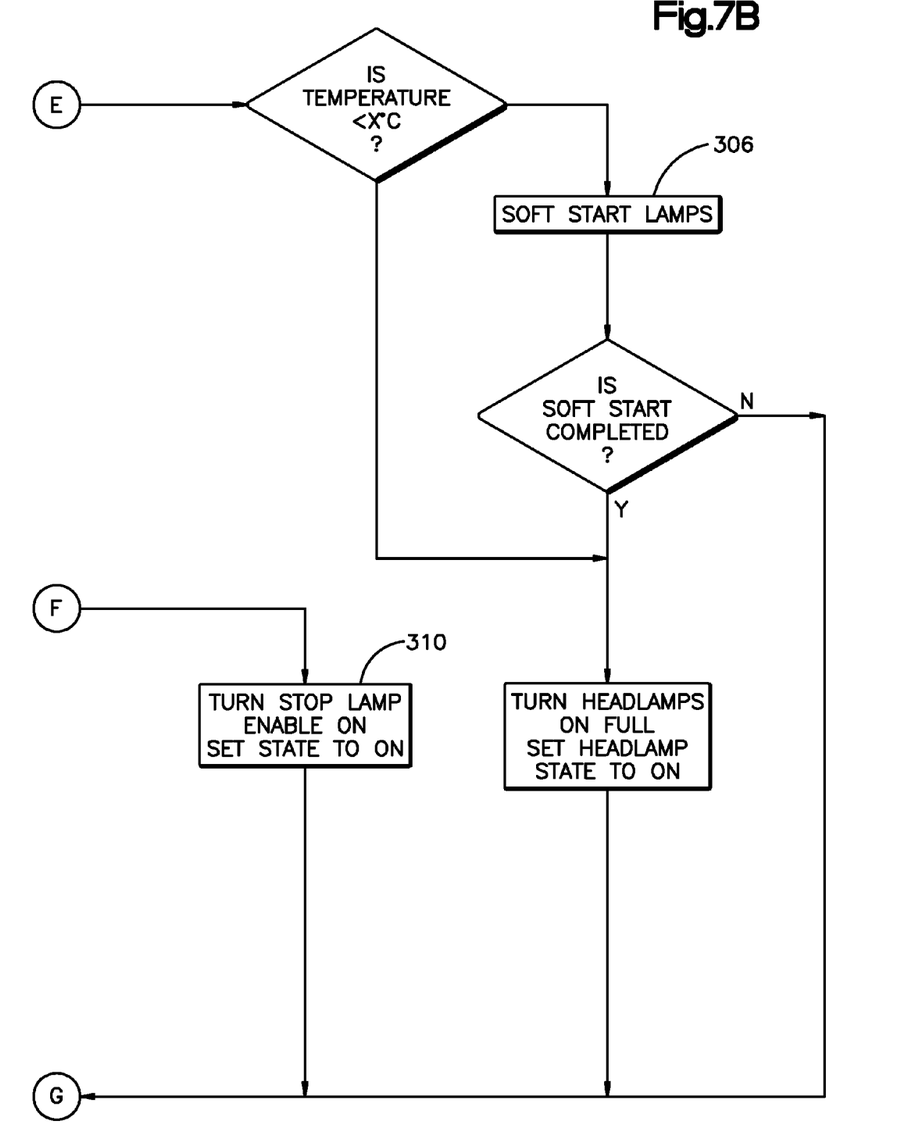

FIGS. 7A and 7B depict an exemplary embodiment of the present invention that includes a method 300 for controlling outputs, such as in response to receiving inputs at the user input interface 10 of FIGS. 1 and 1A. In FIG. 7A, the method 300 begins by determining whether the present primary mode is set for "All Off". If the present primary mode is not set for "All Off", the method 300 proceeds to a decision 302. If the present primary mode is set for "All Off", the method 300 determines if all of the outputs of the vehicle illumination system are off. If all of the outputs of the vehicle illumination system are not off, the method 300 proceeds to the decision 302. If all of the outputs of the vehicle illumination system are off, the method 300 ends based on all of the outputs being switched off as a result of the primary mode being set to "All Off".

At the decision 302, the controller determines whether the state of the headlamps (i.e., activated or deactivated) match the current primary mode. For example, one or more of the primary modes may include activation of the headlamps of the vehicle. If the state of the headlamps matches the current primary mode, the method 300 proceeds to a decision 304. If the state of the headlamps does not match the current primary mode, the method 300 determines whether the headlamps should be activated and that no fault condition is sensed. If the headlamps should not be activated, or are in a fault condition, the method 300 deactivates the headlamps and proceeds to the decision 304. If the headlamps should be activated, and are not in a fault condition, the method 300 proceeds to the step 306 (depicted in FIG. 7B) via the linking symbol "E".

At the decision 304, the controller determines whether the state of the stop lamps (i.e., enabled or disabled) match the current primary mode. For example, one or more of the primary modes may include enablement of the stop lamps of the vehicle, such that the stop lamps are activated based on a user input (e.g., pressing a brake pedal). If the state of the stop lamps matches the current primary mode, the method 300 proceeds to the step 308. If the state of the stop lamps does not match the current primary mode, the method 300 determines whether the stop lamps should be activated and not in a fault condition. If the stop lamps should be activated, and are not in a fault condition, the method 300 proceeds to the step 310 on FIG. 7B via the linking symbol "F". If the stop lamps should not be activated, or are in a fault condition, the method 300 disables the stop lamps and proceeds to the step 308. The method 300 sets the remaining output conditions associated with the vehicle lamps at 308 based on the current primary and/or auxiliary mode and the current fault conditions and ends. Therefore, the method 300 ends by individually activating or deactivating the remaining vehicle lamps based on the currently set primary and/or auxiliary mode, and based on which of the vehicle lamps are faulted.

FIG. 7B demonstrates activation of the headlamps and/or the stop lamps of the vehicle. The method 300 initiates a soft start of the filament type headlamps at 306 in response to the state of the headlamps being set for activation absent a fault condition. Activation of the headlamps of a vehicle can result in a high inrush current draw (e.g., 80 amps or more), such that instantaneous current flow of the illumination system can exceed a predetermined threshold of the headlamps and/or a summation over-current threshold of the illumination system as a whole. Particularly, the current draw of the headlamps can be the highest at lower temperatures of the headlamp filaments. Therefore, the microcontroller 20 incorporates an algorithm for soft starting the headlamp drive, such as the drive 110 in the example of FIG. 3. A temperature sensing device such as a thermistor may be used to determine an approximate ambient temperature. The temperature sensor will send temperature information to the microcontroller 20 so that the microcontroller can determine if soft starting the lamps is required. A typical temperature threshold is 10° F., below which soft start will be enabled.

In an exemplary embodiment, the microcontroller 20 commands the output drive 110 of the headlamps to provide a pulsed signal to the headlamps, such that the headlamps receive current pulses. The pulse rate of the pulsed signal begins at a high frequency to preheat the filament in the headlamp bulbs. As the filament warms, the on-state of the pulsed signal is extended while the off-state of the pulsed signal is steadily reduced in frequency, such that the current pulses to the headlamps become longer in duration. Therefore, the current draw of the headlamps is steadily reduced until the current is low enough to fully activate the output drive 110 (i.e., the frequency of the off-state is reduced to zero). Accordingly, because the temperature of the headlamp filaments is gradually increased by the current pulses prior to full activation of the headlamps, the inrush current of the headlamps is greatly reduced.

Upon initiating the soft start of the headlamps at the step 306, the method 300 determines if the soft start of the headlamps is complete. For example, the method 300 determines if the inrush current associated with headlamps is at an acceptable level, or determines that a temperature associated with the headlamp filaments is at a level that can result in an acceptable level of inrush current. If the soft start of the headlamps is complete, the method 300 fully activates the headlamps, such as by setting the frequency of the off-state of the pulsed signal equal to zero, and sets the state of the headlamps to "on". Upon full activation of the headlamps, or upon the soft start of the headlamps being incomplete, the method 300 ends by returning to FIG. 7A via the linking symbol "G".

It is understood that vehicle lamps 14 can be either filament type lamps or light emitting diode (LED) type lamps. A particular application may have 100% of one of the types or any combination of the different types of lamps. The LED type lamps do not exhibit cold filament characteristics typical of filament type lamps. They have a fairly constant current draw regardless of temperature. The LED type lamps also have significantly lower current draw than filament type lamps.

Due to the fact that a vehicle may have either type or a combination of filament type and LED type lamps another exemplary embodiment will alleviate an over current fault from being generated due to high inrush current, by having the microcontroller 20 increase an over current fault threshold by a given or calculated amount. The threshold will stay at its increased value for a predetermined or calculated amount of time to ensure that inrush current is over and then microcontroller 20 will reduce the threshold to a lower value. In the case of filament type lamps being used, the temporary increase in over current threshold eliminates false over current faults. And in the case of LED type lamps being used, the temporary increase in over current threshold does not adversely effect operation. Therefore any combination of lamp types can be used without any adverse effects.

Figure 2A:
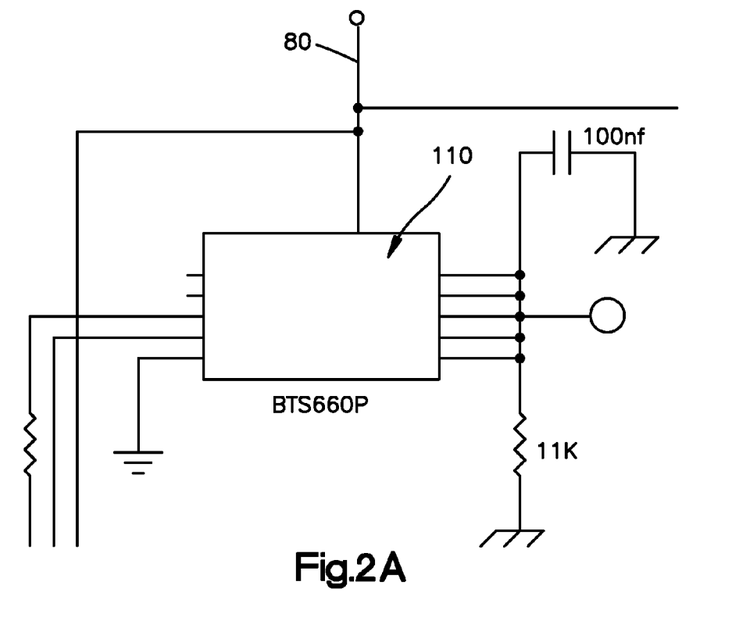
FIGS. 2A and 2B are alternate drive circuits for use with an exemplary embodiment of the invention.
Figure 2B:
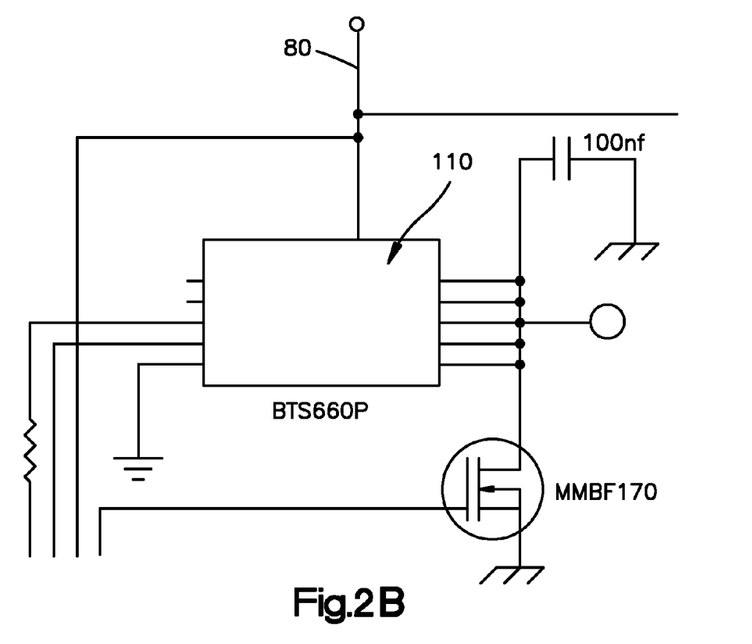

Typical current draw per LED lamp is in the 25 mA to 100 mA range. It is not uncommon to arrange many individual LED lamps into an array to form a lamp assembly. The lamp assemblies are located on vehicles in typical locations. LED type lamps are very efficient in their use of power to produce light. In LED arrays typical of vehicular lamp assemblies, the many individual LED devices that form the lamp assembly provide for a very noticeable display. A known issue with the high efficiency of the LED lamps 14 and solid state driver circuitry such as 110 is that very small amounts of current flow, less than 100 uA, will cause the LED array to produce light. Small amounts of leakage current are typical of certain electronic drivers such as 110. This can be undesirable in many circumstances. In an effort to reduce or eliminate the leakage current and hence the undesired illumination of the LEDs, various methods may be employed including adding passive components such as a resistor 113 on the driver output 111 to shunt leakage current through some path other than through the LED. Typically this path is vehicle battery ground. Alternately an active clamp may be used such as a transistor 115, which could be a Field Effect or bipolar type, either of which will be on when the driver is off, so that the leakage current will be shunted through a path other than the LED.

In response to the state of the stop lamps being set for enablement absent a fault condition, the method 300 enables the stop lamps and sets the state of the stop lamps to "on" at the step 310. It is to be understood that the stop lamps may require an additional input from a user, such as via a brake pedal, to activate the stop lamps once the stop lamps are enabled by the microcontroller 20. However, the state of the stop lamps corresponds to an enablement setting associated with the current primary and/or auxiliary illumination mode, and are thus set to "on" regardless of actual activation of the stop lamps. The method 300 then ends by returning to FIG. 7A via the linking symbol "G".

The above described method 300 describes a manner in which headlamps and stop lamps are activated and/or enabled separately from other lamps in the vehicle illumination system. Specifically, FIGS. 7A and 7B describe soft starting of the headlamps and enablement of the stop lamps, as opposed to direct activation.

Figure 8A:
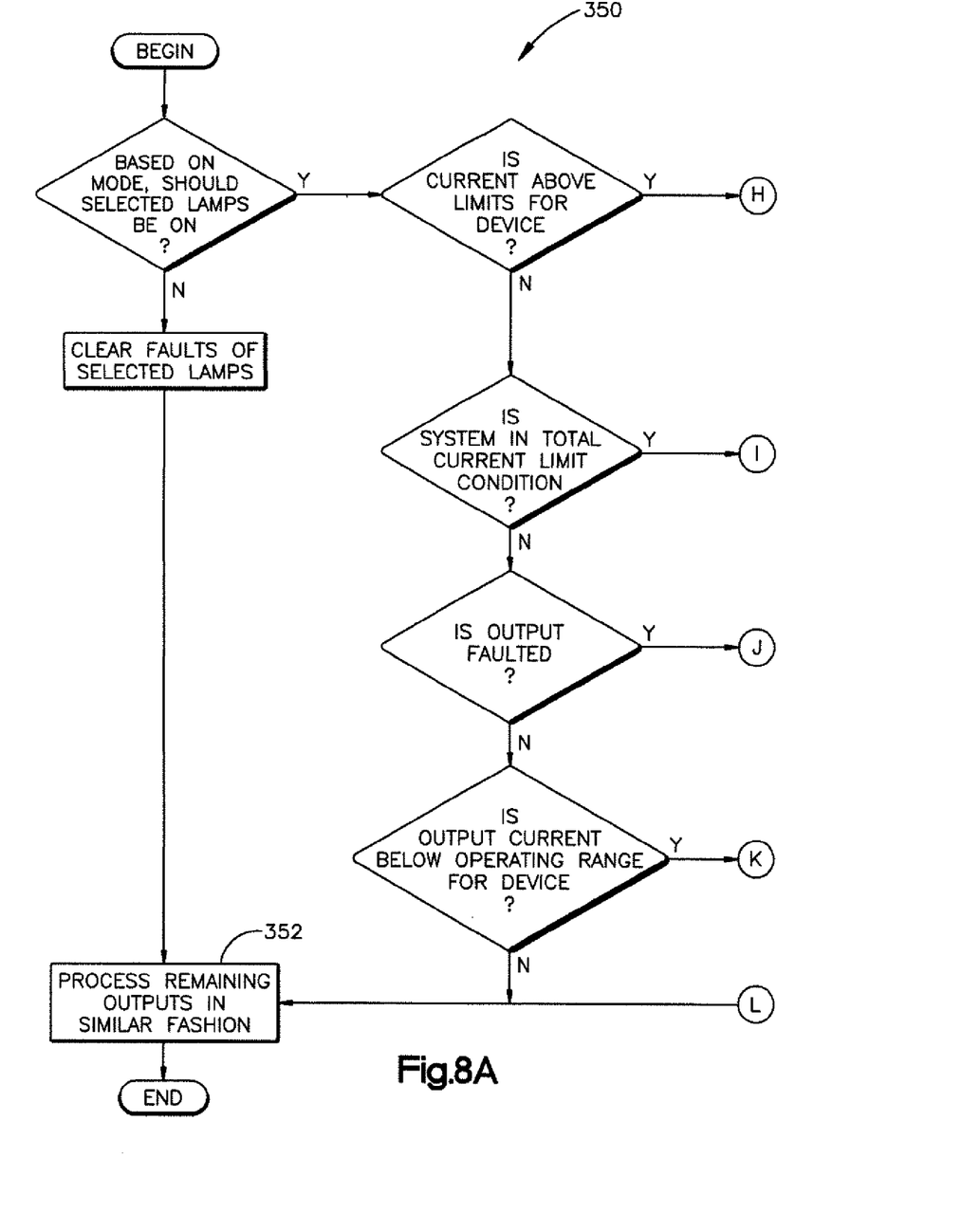
FIGS. 8A and 8B illustrate a flow diagram associated with a fault detection and processing system in a vehicle light system.
Figure 8B:
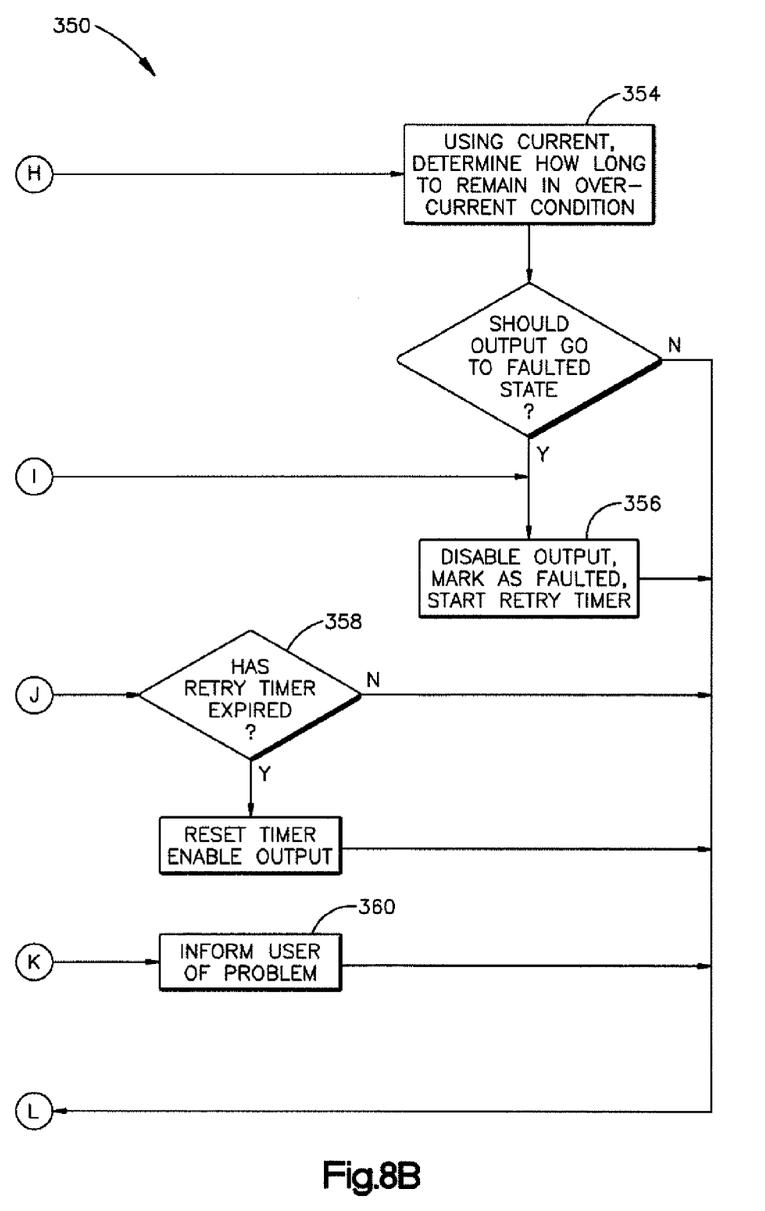

FIGS. 8A and 8B depict an exemplary embodiment of the present invention that includes a method 350 for processing faults, such as in response to one of an over-current condition associated with an individual output device driver or a summation over-current condition associated with the vehicle illumination system. The method 350 can be applicable to a given one of the output device drivers 110, 112, 114, 116, 118, and 120. As an example, the vehicle illumination system may implement the method 350 for each of the output device drivers 110, 112, 114, 116, 118, and 120 sequentially, or in separately running processes concurrently. Therefore, in the example of FIGS. 8A and 8B, it is to be understood that the "selected lamp(s)" refers to the lamp(s) corresponding to a given one of the output device drivers 110, 112, 114, 116, 118, and 120.

In FIG. 8A, the method 350 begins by determining whether the selected lamps are activated based on the selected illumination mode (e.g., primary and/or auxiliary). If the selected lamps are not activated based on the selected illumination mode, the method 350 clears faults associated with the selected lamps and proceeds to the step 352, at which the method 350 processes the remaining outputs associated with one or more of the output device drivers 110, 112, 114, 116, 118, and 120 before ending. If the selected lamps are activated based on the selected illumination mode, the method 350 determines if the current is above a limit for the device. For example, the device can correspond to one or more of the illumination lamps, or can correspond to the selected one of the output device drivers 110, 112, 114, 116, 118, and 120. If the current is above a limit for the device, the method 350 proceeds to the step 354 (depicted on FIG. 8B) via the linking symbol "H".

If the current is not above a limit for the device, the method 350 determines if a summation over-current condition exists for the vehicle illumination system. For example, the method 350 determines if the total aggregate output current associated with all vehicle lamps exceeds a summation over-current threshold. In an exemplary embodiment, the summation over-current threshold is less than a sum of the over-current thresholds associated with each of the individual vehicle lamps. If a summation over-current condition exists for the vehicle illumination system, the method 350 proceeds to the step 356 on FIG. 8B via the linking symbol "I". If a summation over-current condition does not exist for the vehicle illumination system, the method 350 determines if the output associated with the specific output device driver is faulted. For example, one of the output device drivers 110, 112, 114, 116, 118, and 120 can become faulted based on an over-current condition, as demonstrated below in the example of FIG. 8B. If the output associated with the specific output device driver is faulted, the method 350 proceeds to the decision 358 on FIG. 8B via the linking symbol "J". If the output associated with the specific output device driver is not faulted, the method 350 determines if the output is below the current limit for the device, such as based on a normal operating condition for the device. If the output is below the current limit for the device, the method 350 proceeds to the step 360 on FIG. 8B via the linking symbol "K". If the output is not below the current limit for the device, the method 350 proceeds to the step 352, such that the method 350 begins again with the next one or more of the output device drivers 110, 112, 114, 116, 118, and 120.

The method 350 described above regarding the example of FIG. 8A demonstrates a continuous over-current diagnostic check, both for an over-current associated with an individual output device driver and for a summation over-current. The example of FIG. 8B demonstrates how fault conditions are set and cleared.

Upon the current being above a limit for the device, the method 350 determines at 354 how long the device should remain in an over-current condition based on a magnitude of the current. As an example, the amount of time the device should remain in the over-current condition is inversely proportional to the magnitude of the current, such that greater amounts of current results in less time in the over-current condition. The method 350 then determines if the output device driver should go to a faulted state based on the amount of time determined in the step 354. For example, the method 350 could set a timer threshold based on the amount of time determined in the step 354, such that the method 350 determines if the output device driver should go to the faulted state based on whether an elapsed time in the over-current condition exceeds the timer threshold. If the output device driver should not go to the faulted state, for example, as a result of the current dropping below the over-current limit for the device before expiration of the timer, the method 350 proceeds to the step 352 via the linking symbol "L".

If the output device driver should go to the faulted state, the method 350 proceeds to the step 356, at which the output device driver is disabled, marked as faulted, and a retry timer associated with the output device driver is started. The method 350 then proceeds to the step 352 via the linking symbol "L".

With regard to marking the fault condition, in an exemplary embodiment, the microcontroller 20 includes an algorithm that provides diagnostics for informing the user that an output fault exists by flashing an appropriate indicator (e.g., fault LED for a specific output). In addition, the algorithm in the exemplary embodiment uses voltage and current feedback to determine the nature of the fault, such that the microcontroller 20 determines if the specific output device driver has an output fault that is an open circuit fault (e.g., from a burned-out or open lamp) or short circuit fault. This element of diagnostics provides real time feedback to the operator when a problem occurs, such that the microcontroller 20 determines if a specific lamp is open or shorted based on monitoring the voltage and current parameters on each output. A fault indicator LED for the output is illuminated and flashed when an appropriate fault condition is present. As an example, the type of fault is identified by the rate of flashing, such as a short circuit condition represented by a fast pulse and an open circuit condition represented by a slow pulse.

In an exemplary embodiment of the present invention, the retry timer at the step 356 is implemented as a timer that is configured for clearing a fault condition. As an example, the retry timer is a directly proportional timer. The retry timer is thus a timer for recovering from a fault condition that has a variable timing threshold based on the amount of the over-current. In the exemplary embodiment, the retry timer is specific to a given one of the faulted outputs, thus allowing each of the faulted outputs to recover individually. Because the fault is recovered from individually, and because the over-current amount sets the amount of time delay based on the severity of the fault (i.e., greater time delay for greater amounts of over-current), the vehicle illumination system can recover from faults at a safe rate, as opposed to repeated retry attempts for all faulted outputs in short periods of time. Therefore, excess heat damage to the vulnerable circuit components, such as the output device driver, and/or wire harness assemblies is mitigated.

Figure 4B:
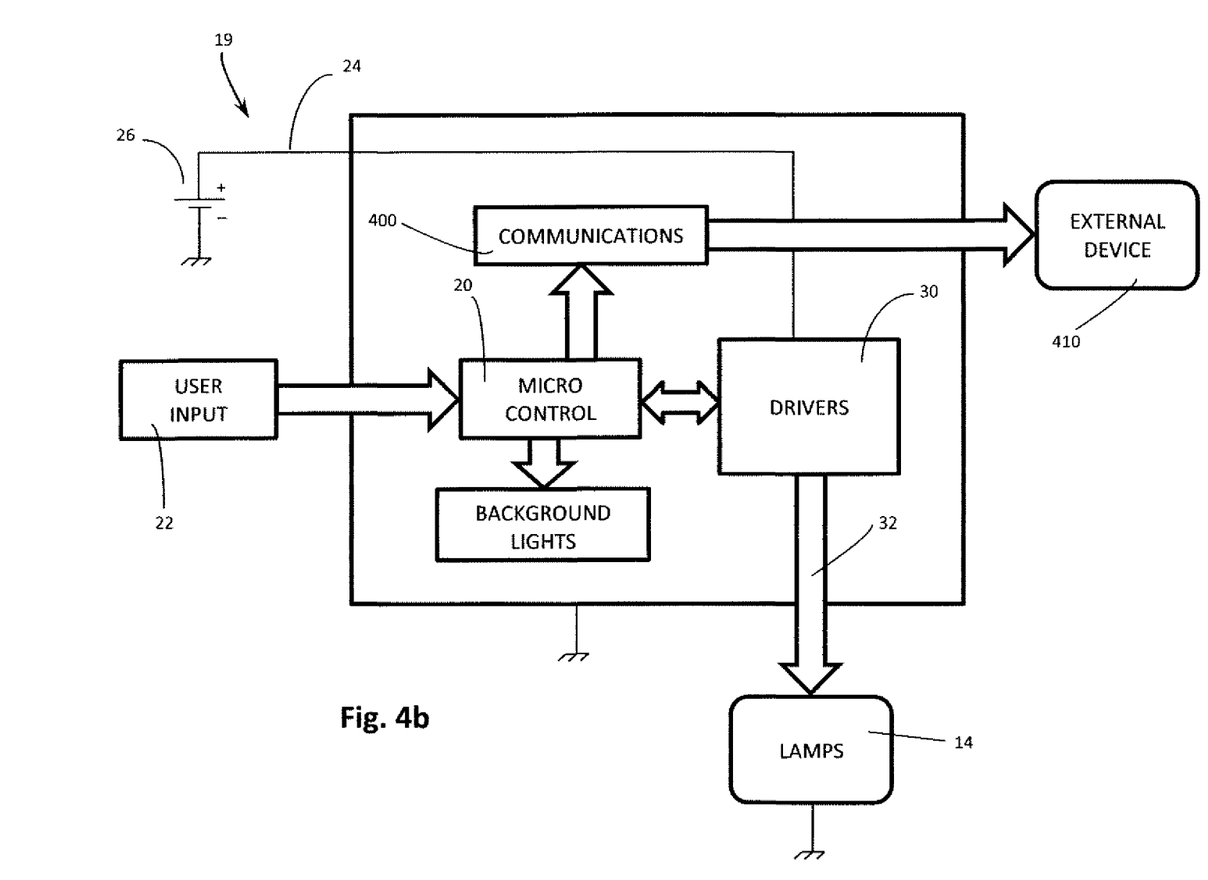
FIG. 4b illustrates an example of an overview of a vehicle light system including communications capabilities to an external device.

Upon a determination of a faulted output, the method 350 determines 358 whether the retry timer has expired. If the retry timer has expired, the timer is reset and the output is enabled, thus clearing the fault condition. Upon clearing the fault, or if the retry timer has not expired, the method 350 proceeds to the step 352 via the linking symbol "L". Upon an output current being below an operating range for the device, the method 350 informs the user of the problem at the step 360 by illuminating an indicator LED, or by sending a message via communications protocols. An exemplary system uses SAE J1939 as the protocol, but other protocols such as J1850, LIN, or FlexRay are permissible alternates. The message transmission may be through the flashing of an indicator light or through an electrical connection through the device connector pins. Communications can be transmitted from the controller by using a communications hardware physical layer 400 as shown in FIG. 4b. External device 410, also shown in FIG. 4b, could be a handheld device having a visual and/or audible indicator used for diagnostics, or it could be a vehicle mounted electronic module that is in communication with the controller 20. As an example, the problem could include an open circuit condition, such as a burned-out lamp corresponding to the given output device driver. The method 350 then proceeds to the step 352 via the linking symbol "L".

The method 350 described above regarding the example of FIG. 8B thus demonstrates an embodiment of the present invention of how faults are set and cleared. In addition, in another exemplary embodiment of the present invention, the vehicle illumination system can implement sequential activation and/or deactivation of vehicle lamps to provide over-current protection. The sequential activation and/or deactivation can be implemented separate from or in conjunction with the method 350.

In an exemplary embodiment, the microcontroller 20 staggers activation of vehicle lamps to reduce inrush current, thus preventing a summation over-current condition. For example, in response to a user selecting a primary and/or auxiliary illumination mode via the user input interface 10, a number of vehicle lamps 14 may be commanded by the microcontroller 20 to be activated. Each of the vehicle lamps 14 may draw an inrush current, such that, when activated concurrently, the aggregate amount of the inrush current can exceed the summation over-current threshold for the vehicle illumination system. To prevent the excessive inrush current of all of the vehicle lamps at once, the microcontroller 20 staggers the output turn-on sequence, such that each of the vehicle lamps is activated individually in a rapid sequence. As a result, the sequential activation of the vehicle lamps provides a gradual current draw to avoid a bulk inrush of current which can stress other electrical components on the vehicle (e.g., the alternator), and cause a nuisance summation over-current condition.

In another exemplary embodiment, the microcontroller 20 sequentially deactivates vehicle lamps based on a priority structure in a load-shedding procedure, such that over-current conditions can be avoided and/or cleared. Sequentially, upon a summation over-current condition, the microcontroller 20 begins load-shedding, such that one or more of the output drives are deactivated to reduce the aggregate output current associated with the vehicle lamps. In an example, the microcontroller 20 incorporates an algorithm for setting the priority of output drives from highest to lowest based on considerations of safety. As a result, the most important output drives remain active in the event of a summation over-current condition. For example, the set priority dictates that the least needed output drives are deactivated, leaving the most important drives (e.g., headlamps) active.

The load-shedding priority can be set in a variety of ways. For example, in one exemplary embodiment, the priority of load-shedding is determined automatically by the microcontroller 20. In this example, if a given output drive exceeds an individual over-current limit and a summation over-current condition is present, that individual output drive is deemed to have the highest priority, and is thus the first to be disabled. In another exemplary embodiment, the load-shedding priority is predefined by the user or is programmed into the microcontroller 20. As such, upon the occurrence of a summation over-current condition, the lowest priority output is deactivated first and the summation current re-checked. If the over-current condition remains, such that the aggregate vehicle lamp output current is still too high, the next lowest priority is deactivated. This low-to-high prioritization is repeated until the summation over-current condition is removed, such that the aggregate vehicle lamp output current is at a valid operational level. As yet another exemplary embodiment, the microcontroller 20 implements a load-shedding priority that is a combination of the prior two examples. As such, priority is set based on individual over-current levels, with predefined exceptions (e.g., headlamps) being allowed to continue being activated, even if experiencing an individual over-current condition. Regardless of the priority scheme implemented, the load-shedding priority embodiment allows systematic disabling of output drives until the summation over-current condition clears for safer operation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims

What is claimed is:

1. A vehicle illumination system comprising:
an input configured to receive at least one input command;
a controller configured to receive input commands provided by the input and to control a state of a plurality of output device drivers corresponding to a respective plurality of vehicle light sources that are selectively energized; and
at least one indicator configured to indicate to a user a condition associated with at least one of the plurality of output device drivers wherein the controller communicates with the indicator by means of a communications protocol.

2. The illumination system of claim 1 further comprising an protection circuitry configured to monitor an electrical signal associated with each of the plurality of output device drivers relative to respective over-current condition thresholds.

3. The illumination system of claim 2 wherein the controller is further configured to receive input commands provided by temperature signals based on sensed temperature and wherein the over-current conditions are adjusted based on sensed temperature.

4. The illumination system of claim 2 wherein the protection circuitry also monitors a summation over-current condition threshold, the summation over-current threshold being less than a sum of the respective over-current condition thresholds associated with each of the plurality of outputs.

5. The vehicle illumination system of claim 1, wherein the controller is configured to sequentially activate each of the plurality of vehicle lamps in response to a respective input command.

6. The vehicle illumination system of claim 2, wherein the protection circuitry is further configured to detect a short circuit condition associated with a given one of the plurality of output device drivers based on at least one of a magnitude of current and a magnitude of voltage associated with the given one of the plurality of output device drivers, and further configured to detect an open circuit condition based on at least one of the magnitude of current and the magnitude of voltage associated with the given one of the plurality of output device drivers.

7. The vehicle illumination system of claim 1 wherein the indicator comprises at least one fault indicator configured to signal a user of at least one vehicle light fault associated with at least one of the plurality of device drivers.

8. The vehicle illumination system of claim 1 wherein the controller and/or an interface circuit implements a SAE J1939 protocol.

9. The vehicle illumination system of claim 1, wherein at least one of the plurality of output device drivers provides a pulsed current output to the respective one of the plurality of vehicle lamps, the pulsed current output gradually decreasing an off-state frequency over a predetermined period of time to eventually provide a substantially DC current to the respective one of the plurality of vehicle lamps.

10. The vehicle illumination system of claim 2, wherein the protection circuitry comprises a fault timer, and wherein the controller is further configured to deactivate a given one of the plurality of outputs upon the respective electrical signal exceeding the respective over-current condition threshold, and further configured to reactivate the given one of the plurality of outputs upon expiration of a set time associated with the fault timer, the set time being based on a magnitude of the electrical signal associated with the given one of the plurality of outputs.

11. The vehicle illumination system of claim 1, wherein the at least one input provided by the user is a first input associated with selecting an illumination mode associated with the plurality of vehicle lamps, and wherein an input keypad is further configured to prompt the user to verify the illumination mode selection and to permit selecting a different illumination mode prior to verifying the illumination mode selection.

12. A method for controlling a vehicle illumination system, the method comprising:
monitoring an input for creating at least one input command;
providing an input command to a controller in response to a status of the at least one input to controllably activate one or more vehicle light sources;
continuously monitoring an electrical signal associated with each of a plurality of outputs associated with the controller;
controlling a state of the plurality of outputs with respect to each of a plurality of vehicle; and
transmitting a communication from the controller to an indicator for indicating a status of one or more of the plurality of outputs.

13. The method of claim 12, wherein sequentially controlling the state of the plurality of outputs comprises sequentially activating each of the plurality of vehicle lamps.

14. The method of claim 12, further comprising:
continuously monitoring a summation current flow associated with the plurality of outputs relative to a summation over-current condition threshold; and
signaling a summation over-current condition upon the summation current flow exceeding the summation over-current condition threshold.

15. The method of claim 14, further comprising assigning a priority associated with each of the plurality of vehicle lamps, wherein sequentially controlling the state of the plurality of outputs comprises, upon signaling the summation over-current condition, sequentially deactivating the plurality of vehicle lamps until the summation current flow decreases below the summation over-current condition threshold.

16. The method of claim 15, wherein the priority associated with each of the plurality of vehicle lamps is based at least on the electrical signal associated with a given one of the plurality of outputs exceeding a respective over-current condition threshold.

17. The method of claim 16, further comprising setting the summation over-current condition threshold to a magnitude that is less than a sum of the respective over-current condition thresholds associated with each of the plurality of outputs.

18. The method of claim 12, wherein controlling the state of the plurality of outputs comprises providing a pulsed current output to a vehicle headlamp, the pulsed current output gradually decreasing an off-state frequency over a predetermined period of time to eventually provide a substantially DC current to the vehicle headlamp.

19. The method of claim 12, further comprising:
deactivating a given one of the plurality of outputs upon the electrical signal associated with the given one of the plurality of outputs exceeding the respective over-current condition threshold; and
reactivating the given one of the plurality of outputs upon expiration of a set time associated with a fault timer, the set time being based on a magnitude of the electrical signal associated with the given one of the plurality of outputs.

20. The method of claim 12, further comprising:
continuously monitoring a magnitude of voltage associated with each of the plurality of outputs;
signaling a short circuit fault associated with a given one of the plurality of outputs upon detecting a short circuit condition based on at least one of a magnitude of current and the magnitude of voltage associated with each of the plurality of outputs; and
signaling an open circuit fault associated with a given one of the plurality of outputs upon detecting an open circuit condition based on at least one of the magnitude of current and the magnitude of voltage associated with each of the plurality of outputs.

21. The method of claim 12 threshold further comprises transmitting a communication that enables an indicator mounted to the vehicle.

22. The method of claim 21 wherein said indicator emits an audible tone or a light.

23. The method of claim 12 wherein said communication comprises a communication protocol conforming to SAE J1939 standards.

24. The method of claim 20 wherein signaling a short circuit fault or signaling a open circuit fault further comprises transmitting a communication that activates an indicator.

25. The method of claim 24 wherein said indicator provides an audible tone or light.

26. The method of claim 25 wherein said communication comprises a communication protocol conforming to SAE J1939 standards.

* * * * *